United States Patent

Shimojima

[19]

[11] Patent Number: 5,818,687
[45] Date of Patent: Oct. 6, 1998

[54] METHOD OF PRODUCING SOLID ELECTROLYTIC CAPACITOR ELEMENT

[75] Inventor: Masatoshi Shimojima, Osaka, Japan

[73] Assignee: Rohm Co., Ltd., Kyoto, Japan

[21] Appl. No.: 794,810

[22] Filed: Feb. 5, 1997

[30] Foreign Application Priority Data

Feb. 16, 1996 [JP] Japan .................................. 8-029145

[51] Int. Cl.$^6$ .................................................... H01G 9/04
[52] U.S. Cl. .......................... 361/528; 361/529; 29/25.03
[58] Field of Search ..................................... 361/528–531, 361/303–307; 29/25.03, 842–843, 874, 876–879; 429/40–41, 44–45, 27–28, 163–165, 178

[56] References Cited

U.S. PATENT DOCUMENTS 4,791,532  12/1988  Gouvernelle et al. .................. 361/529

*Primary Examiner*—Bot L. Ledynh
*Attorney, Agent, or Firm*—Keiichi Nishimura

[57] ABSTRACT

A capacitor element for use in a solid electrolytic capacitor is formed by sintering metallic powder inside a porous body to produce a chip member having one end of an anode wire buried inside the chip member. The chip member and the anode wire are welded together by laser irradiation within an atmosphere of an inactive gas or an oxidation-reduction gas to form one or more welded portions where the anode wire emerges from the chip member such that the anode wire is made stronger against bending.

8 Claims, 2 Drawing Sheets

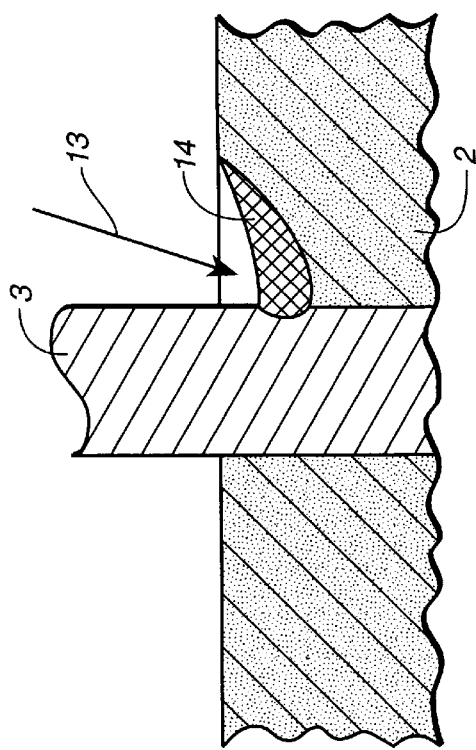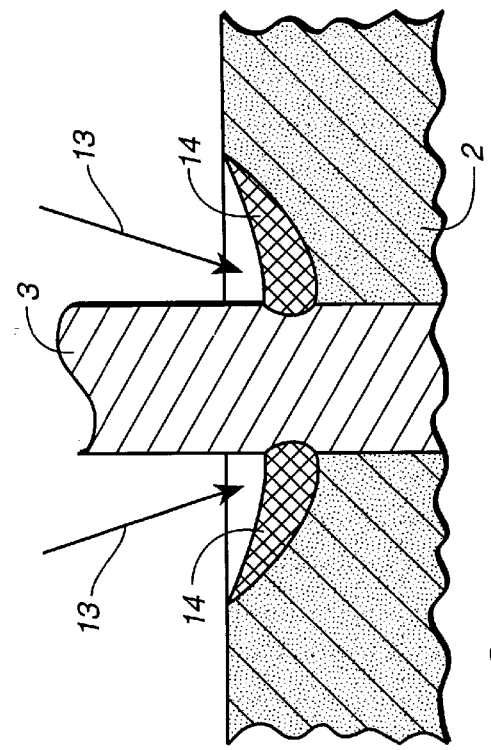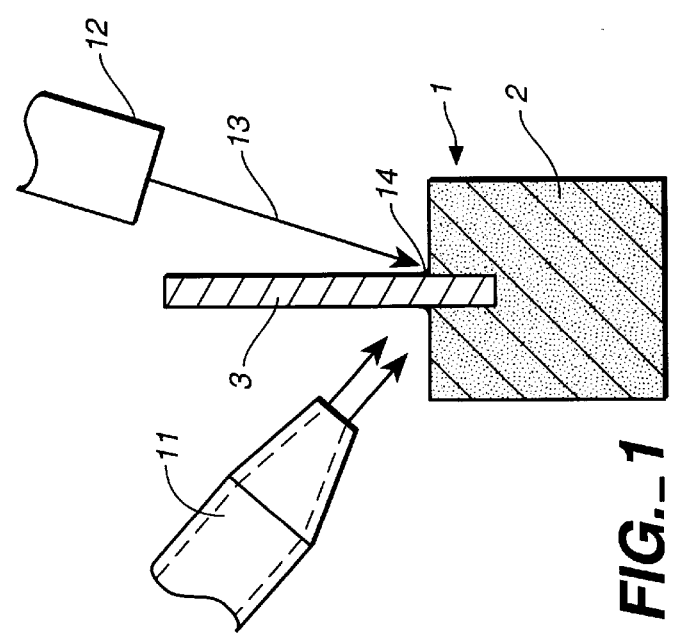

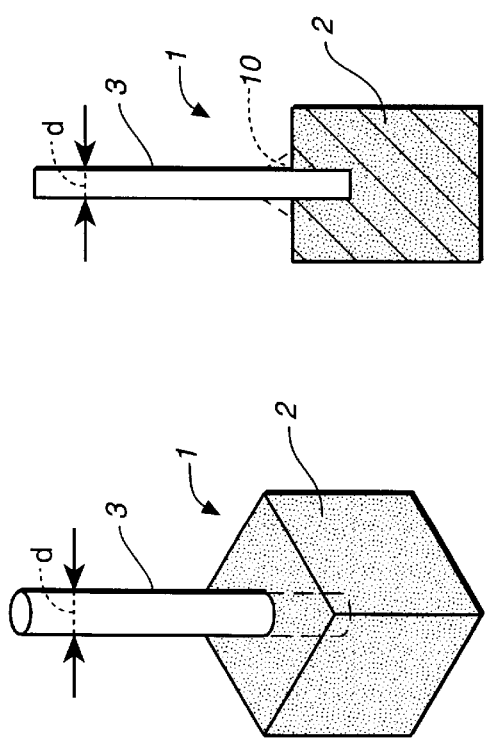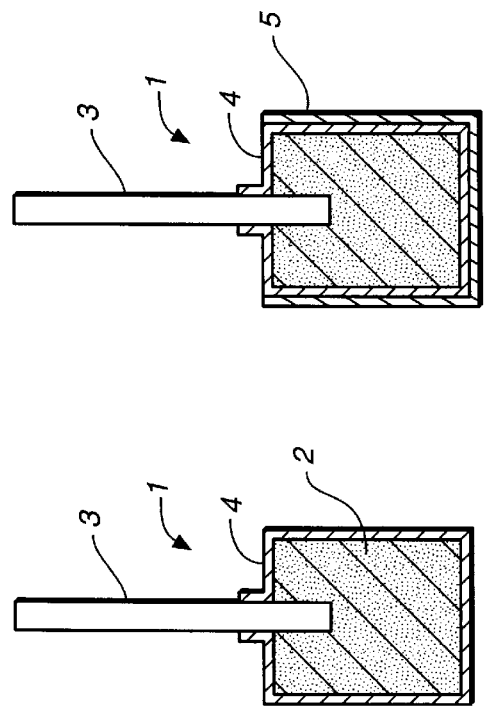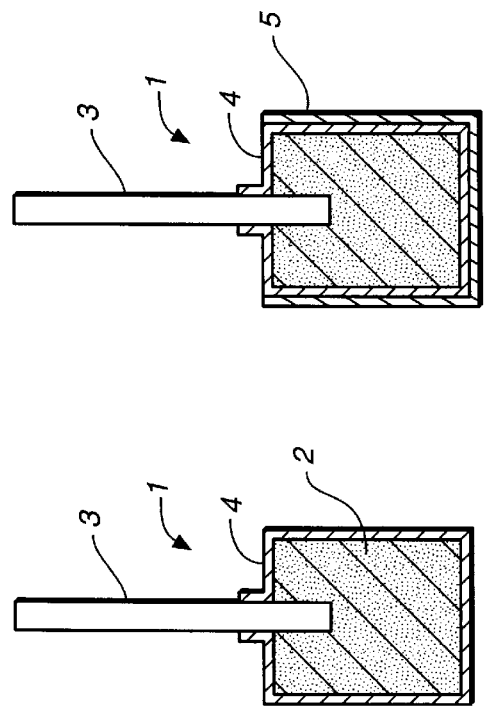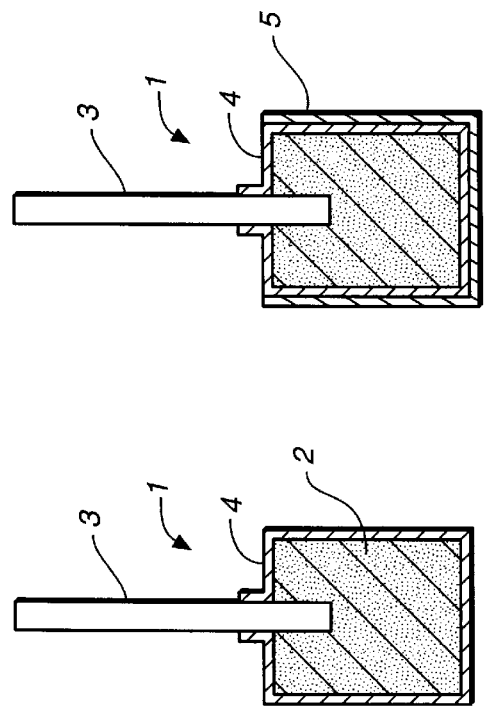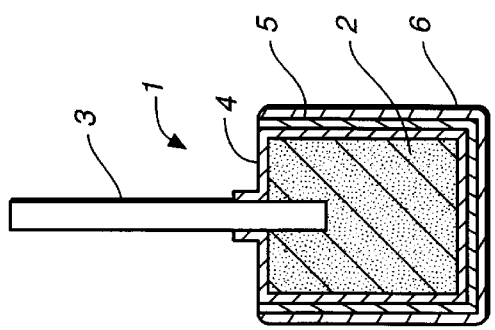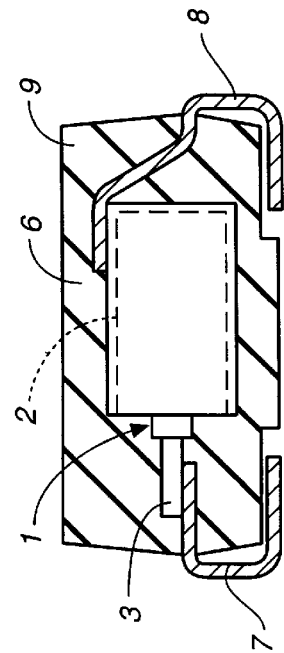

METHOD OF PRODUCING SOLID ELECTROLYTIC CAPACITOR ELEMENT

BACKGROUND OF THE INVENTION

This invention relates to a method of producing a capacitor element which may be used in a solid electrolytic capacitor such as a tantalum or aluminum electrolytic capacitor.

As shown in FIGS. 4 and 5, a prior art capacitor element 1 of this type for use in a solid electrolytic capacitor is produced by filling a porous chip member 2 with metallic powder (say, of tantalum) so as to bury one end of a metallic anode wire 3 (say, also of tantalum) therein and thereafter sintering it at a high temperature. Such a chip member 2 may be immersed in a liquid chemical such as an aqueous solution of phosphoric acid to be subjected to an anode oxidation process by passing a direct current between the anode wire 3 protruding therefrom and the chemical so as to form a dielectric film 4 (say, of tantalum tetroxide), as shown in FIG. 6, not only on the surface of each metallic powder but also on the part of the anode wire 3 where it is attached to the chip member 2. If such a chip member 2 is immersed in an aqueous solution of manganese nitrate, pulled out and sintered, these steps being repeated several times, a solid electrolyte film 5 is formed as shown in FIG. 7 (say, of manganese dioxide). If a metallic film (say, of silver or nickel) is formed on this solid electrolyte film 5 with a graphite film as a base, as shown in FIG. 8, there results a cathode film 6 comprising the solid electrolyte film 5, the graphite film and the metallic film all over the chip member 2 except where the anode wire 3 protrudes. Such a capacitor element 1 may be incorporated into a solid electrolytic capacitor as shown in FIG. 9, sandwiched between a pair of lead terminals 7 and 8, having the anode wire 3 attached to one of the lead terminals (7), say, by welding and the cathode film 6 connected to the other of the lead terminals (8), and having the entire assembly packed inside a mold 9 made of a synthetic resin material.

Since the capacitor element 1 is so structured with one end of its anode wire 3 buried in the chip member 2, strong forces tend to be concentrated and applied to the base part of the anode wire 3 and hence to bend it where it connects to the chip member 2. If the anode wire 3 undergoes deformation, it is no longer possible to form a capacitor as shown in FIG. 9. If such a deformation comes about after the dielectric film 4 has been formed on the chip member 2, cracks in the dielectric film 4 tend to result where the anode wire 3 is attached to the chip member 2, breaking up the insulation thereby and adversely affecting the yield.

In view of the above, there have been various attempts such as increasing the thickness (indicated by letter d in FIGS. 4 and 5) of the anode wire 3 or applying a synthetic resin material 10 as shown in FIG. 5 around the anode wire 3 where it attaches to the chip member 2 so as to prevent the bending of the anode wire 3. If the anode wire 3 is made thicker, however, the fraction of the volume of the chip member 2 decreases, and this goes against the need to produce compact devices with a large capacitance. Moreover, the use of a thicker wire causes an increase in the material cost and hence the overall production cost of the capacitor elements. If the method of applying a synthetic resin material is adopted, on the other hand, not only must the resin material be applied but the step of drying it to harden it must be incorporated in the production. Because these steps are time-consuming, this method also results in a significant increase in the cost of production.

No matter which one of these methods is used, the anode wire must be sintered at a high temperature so as to be in electrically conductive relationship with the metallic powder in the chip member and, since the metallic powder cannot be made too small, there were problems in the attempt to provide compact solid electrolytic capacitors with a large capacitance.

SUMMARY OF THE INVENTION

It is therefore an object of this invention to provide an improved capacitor element with which these problems can be overcome and to provide a method of making such capacitor elements.

A capacitor element embodying this invention, with which the above and other objects can be accomplished, may be characterized not only as comprising a chip member having metallic powder sintered inside a porous body and an anode wire with one end buried inside the chip member, but also as having at least one welded portion formed where the anode wire and the chip member are welded together. A method of producing such a capacitor element according to this invention may be characterized as comprising the steps of forming a chip member as described above and then providing it with at least one welded portion between the chip member and the anode wire by irradiating a laser beam, say, within an atmosphere of an inactive gas or an oxidation-reduction gas.

With one or more such welded portions formed between the chip member and the anode wire, parts of the anode wire melt together and then solidify together with some of the metallic powder of the chip member. The anode wire is thus dependably strengthened without having it made thicker. By using a laser beam, the welding can be accomplished easily and within a short time. Thus, the yield of the products can be improved and the production cost can be reduced according to the present invention. Furthermore, since the welding by a laser beam serves to provide a secure electrical connection between the metallic powder in the chip member and the anode wire, the chip member need no longer be sintered at a high temperature.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a sectional front view of a capacitor element being produced by a method embodying this invention;

FIG. 2 is a portion of FIG. 1 shown in an enlarged form;

FIG. 3 is an enlarged sectional view of a portion of another capacitor element embodying this invention;

FIG. 4 is a diagonal view of a prior art capacitor element;

FIG. 5 is a sectional front view of the prior art capacitor element of FIG. 4;

FIG. 6 is a sectional front view of the prior art capacitor element of FIG. 4 after a dielectric film has been formed on its chip element;

FIG. 7 is a sectional front view of the prior art capacitor element of FIG. 6 after a solid electrolyte film has been formed thereon;

FIG. 8 is a sectional front view of the prior art capacitor element of FIG. 7 after a cathode film has been formed thereon; and FIG. 9 is a sectional front view of a solid electrolytic capacitor using a capacitor element.

DETAILED DESCRIPTION OF THE INVENTION

Throughout herein, components which are substantially alike are indicated by the same numerals even though they are components of different products and may not be repetitively explained.

The invention is described next with reference to FIG. 1 which shows a capacitor element 1 embodying this invention, produced by filling a porous body with metallic powder of tantalum to form a chip member 2 so as to have one end of a tantalum anode wire 3 buried inside the chip member 2 and sintering it at a suitable temperature after it is hardened. Next, an inactive gas such as argon is blown out through a nozzle 11 to the base of the anode wire 3 where it emerges from the chip member 2 so as to create an inactive gas atmosphere through which a laser beam 13 is projected from a laser-emitting apparatus 12, welding the anode wire 3 with the chip member 2 where they contact each other.

In a test experiment, a laser beam of wavelength 1065 nm was irradiated at 350–460V for 0.5–1.0 msec such that a portion of the base part of the anode wire 3 and some of the metallic powder of the chip member 2 melted and solidified as shown in FIG. 2 to form a welded portion 14. With the anode wire 3 and some of the metallic powder thus melting and bonded together, the joint can be securely strengthened without having the diameter of the anode wire 3 increased or a synthetic resin material applied where the anode wire 3 emerges from the chip member 2. The tensile strength and bending force of the anode wire 3 relative to the chip member 2 can thus be improved significantly compared to if no welding takes place by a laser beam irradiation.

Because the welding by the irradiation of the laser beam 13 takes place in the atmosphere of an inactive gas such as argon, hardly any oxide film is formed on the chip member 2 or the anode wire 3.

The description of the invention above is not intended to limit the scope of the invention. Many variations are possible within the scope of the invention. For example, FIG. 3 shows another capacitor element embodying this invention characterized as having two welded portions 14 formed diametrically opposite to each other on the circumference of the anode wire 3. Three or more welded portions 14 may be provided by the laser beam 14 to further strengthen the base part of the anode wire 3 emerging from the chip member 2. An oxidation-reduction gas with about 5% of hydrogen mixed with an inactive gas may be used for the welding process by the laser beam 13.

What is claimed is:

1. A method of producing a capacitor element for a solid electrolytic capacitor, said method comprising the steps of:
   forming a chip member by sintering metallic powder inside a porous body with one end of an anode wire buried inside said chip member; and
   forming at least one welded portions between said chip member and said anode wire by irradiating a laser beam within an atmosphere of an inactive gas.

2. The method of claim 1 wherein said at least one welded portion is formed where said anode wire emerges from inside said chip member.

3. The method of claim 1 wherein two welded portions are formed diametrically opposite to each other with respect to said anode wire.

4. The method of claim 1 wherein said metallic powder comprises tantalum.

5. A method of producing a capacitor element for a solid electrolytic capacitor, said method comprising the steps of:
   forming a chip member by sintering metallic powder inside a porous body with one end of an anode wire buried inside said chip member; and
   forming at least one welded portions between said chip member and said anode wire by irradiating a laser beam within an atmosphere of an oxidation-reduction gas.

6. The method of claim 5 wherein said at least one welded portion is formed where said anode wire emerges from inside said chip member.

7. The method of claim 5 wherein two welded portions are formed diametrically opposite to each other with respect to said anode wire.

8. The method of claim 5 wherein said metallic powder comprises tantalum.

* * * * *